United States Patent Office 3,280,942
Patented Oct. 25, 1966

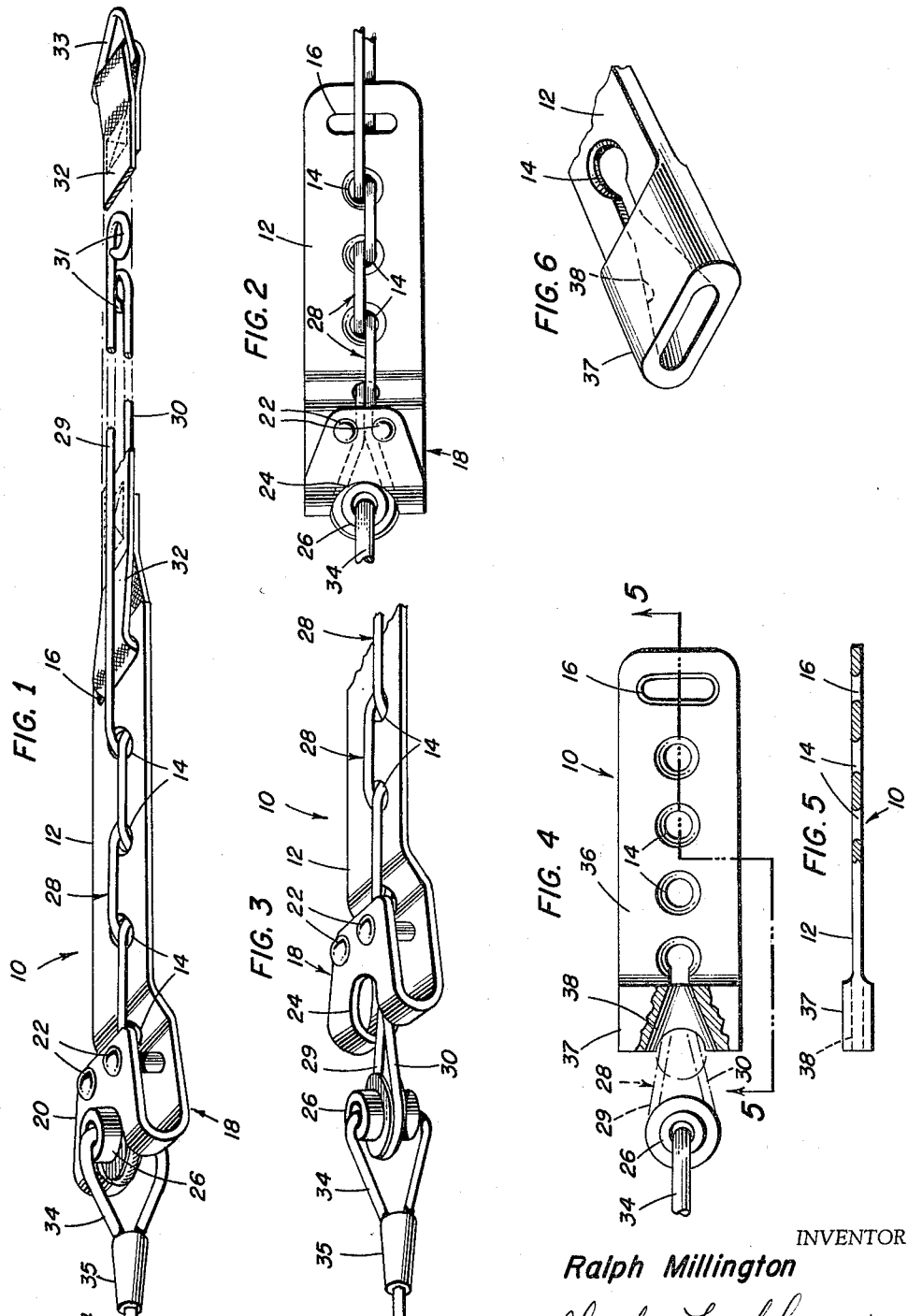

3,280,942
ENERGY ABSORBER-METAL BENDER TYPE
Ralph Millington, West Chester, Pa., assignor, by mesne assignments, to the United States of America as represented by the Secretary of the Navy
Filed Jan. 25, 1965, Ser. No. 427,994
4 Claims. (Cl. 188—1)

The present invention relates to shock absorbers and more particularly to a shock absorber of the metal bender type which is utilized in conjunction with a pilot or troop seat for absorbing shock caused by a hard or crash landing of an aircraft.

In the shock absorber field, it has been the general practice to employ either spring, hydraulic or combinations of spring and hydraulic shock absorbing devices. Although such devices are widely used and have served well the purpose for which they were intended, they have not been successfully employed in conjunction with pilot or troop seats since such seats must be held rigidly in place during normal operation of the aircraft. In other words, spring and hydraulic shock absorbers are continually operable and would, therefore, cause continual oscillation of a seat supported thereby.

This oscillation or continual movement of the seat is highly undesirable, particularly with respect to a pilot's seat. There have been developed, therefore, shock absorbers of the metal bending or metal deforming type which rigidly support the aircraft seat during normal operation of the aircraft but which bend or deform under high load, such as in a hard or crash landing, thereby absorbing the shock thereof. These devices, however, are quite large and bulky and, as a result, are generally utilized only as a support strut for supporting the underside of the seat cushion from the floor of the aircraft.

The general purpose of this invention, therefore, is to provide a shock absorber which has a minimum of working parts and which is of such size and weight as can be advantageously used to support the uppermost ends of a canvas sling type seat thereby embracing all the advantages of similarly employed shock absorbers and possessing none of the aforedescribed disadvantages. To attain this end, the present invention utilizes a small multi-apertured plate member in conjunction with a shock absorbing wire which is drawn through the apertures to absorb the energy of impact over the full length thereof.

Accordingly, an object of the present invention is to provide a shock absorber which can be utilized in conjunction with a pilot or troop seat in an aircraft.

Another object is to provide a shock absorber which is small in size and light in weight and which is characterized by simplicity of construction.

A further object of the invention is to provide a shock absorber which will normally hold a seat rigid and which will withstand tension loads of a predetermined amount but which will absorb energy by the deformation thereof when the load exceeds the predetermined amount.

A still further object of the invention is to provide a shock absorber in which the bending moments therein are equalized.

Other objects, advantages and novel features of the invention will become apparent from the following detailed description of the invention when considered in conjunction with the accompanying drawings wherein:

FIG. 1 is a perspective view, partly broken away, of a preferred embodiment of the invention;

FIG. 2 is a plan view of a portion of the apparatus shown in FIG. 1;

FIG. 3 is a perspective view of one end of the apparatus shown in FIG. 1, partially extended;

FIG. 4 is a plan view partly in section of a modification of the invention;

FIG. 5 is a side elevation view partly in section taken along the lines 5—5 of FIG. 4; and FIG. 6 is a perspective view of one end of the modification shown in FIG. 4.

Referring now to the drawings wherein like reference characters designate like or corresponding parts throughout the several views, there is shown in FIGS. 1, 2 and 3 a shock absorber 10 illustrating a first embodiment of the invention which comprises a flat plate 12 having four drilled and countersunk apertures 14 and a strap receiving slot 16 extending therethrough. The head end 18 of the plate 12 is bent into a generally U-shaped configuration with the free end 20 thereof riveted to the plate 12 by rivets 22. As best shown in FIG. 3, the end face of the head portion 18 has a recessed cutout portion 24 therein for receiving a cable thimble 26. A wire 28 of low carbon steel or the like is looped around the cable thimble 26 at the approximate midpoint of the wire with the two wire halves 29, 30 thereof being interlaced from opposite sides of the plate 12 through the series of apertures 14. That is, beginning with the head end 18 of the plate 12, the wire half 29 passes through the first aperture from the top side of the plate, the second aperture from the bottom side of the plate, the third aperture from the top side of the plate and the fourth aperture from the bottom side of the plate while the wire half 30 skips over the first aperture, passes through the second aperture from the top side of the plate, the third aperture from the bottom side of the plate and the fourth aperture from the top side of the plate. The wire halves 29, 30 are extended a substantial distance beyond the fourth aperture and have loops 31 formed on their respective ends, the diameters of which are greater than the diameters of the apertures 14.

A webbing strap 32 having a ring 33 at its end is secured to the plate 12 by means of the slot 16 while a cable 34 is threaded through the cable thimble 26 and secured by a wrapping 35 or the like.

The shock absorber shown in FIGS. 4, 5 and 6 is substantially the same as that shown in FIGS. 1, 2 and 3 except for the construction of the plate member 36. In this embodiment, the plate member 36 is formed from a single sheet of metal and has an enlarged head portion 37 provided with an internal tapered recess 38 for receiving the cable thimble 26. This embodiment, therefore, does not require bending and riveting of the head portion as does the FIG. 1 embodiment but, rather, is stamped or cast directly in the form shown.

The operation of the shock absorber 10 will now be described with reference to a pilot or troop seat of the canvas sling type wherein one or more shock absorbers 10 are utilized to support the upper ends of the canvas thereof. The canvas strap 32 is secured to the roof or side wall of the aircraft by means of ring 33 and the upper ends of the canvas seat (not shown) are secured to the cable 34 so that the seat is suspended from the aircraft roof or sidewalls by the shock absorber structure 10. Obviously, any number of shock absorbers 10 could be utilized depending upon the size and weight of the seat to be supported.

During normal operations of the aircraft, the seat is rigidly supported by the shock absorber since the wire 28 will not yield until a predetermined tension force is applied thereto. Accordingly, the physical properties and size of the wire 28 are chosen so that the wire will not yield until a tension force of sufficient magnitude is produced by a hard or crash landing. Upon such a landing, the inertia of the seat and its occupant thrusts the seat downwardly toward the floor of the aircraft and therefore tensions the wire 34 securing the seat to the aircraft roof or side wall. When the tension in cable 34 exceeds the aforementioned predetermined amount, the wire halves 29, 30 of the wire 28 are drawn through the apertures 14 thereby absorbing the kinetic energy of impact as the wire is stressed beyond its yield point and caused to permanently deform and elongate. The total amount of energy capable of being absorbed by the wire is dependent upon the physical properties and size of the wire and on the location and number of apertures 14 in plate 12.

The length of the wire halves 29, 30 of the wire 28 is chosen so that the length of the shock absorbing stroke is sufficient to absorb substantially all of the impact energy produced while loops 31 therein, being of greater diameter than the diameter of the apertures 14, prevent the wire from being completely drawn through the apertures. Since the bending loads on the plate 12 are canceled by the opposite lacing of the wire 28, the plate 12 can be made of a thin, light weight, sheet of metal such as aluminum.

Accordingly, a shock absorber has been described which is light in weight and of such small dimension as can be utilized in conjunction with a troop or pilot seat in an aircraft, which shock absorber absorbs energy at a constant rate over the full length of the wire and which is inexpensive to produce.

Obviously many modifications and variations of the present invention are possible in the light of the above teachings. It is therefore to be understood that within the scope of the appended claims the invention may be practiced otherwise than as specifically described.

What is claimed is:

1. A shock absorber of the metal bending type for use in conjunction with an aircraft canvas sling seat to absorb the impact of a hard or crash landing comprising a plate having first and second faces and a plurality of longitudinally spaced transverse apertures, said plate having an enlarged head at one end and a strap receiving slot at the other end, said enlarged head having a cutout portion therein;

a cable thimble normally disposed in said cut-out portion, said thimble having a cable passed therethrough and adapted to be secured to the canvas sling seat;

a shock absorbing wire looped near its midpoint about said cable thimble so as to define first and second wire halves, said first wire half being passed through a first of said apertures near said thimble in a direction from said first side of said plate to said second side of said plate and through a second of said apertures in a direction from said second side of said plate to said first side of said plate, said second wire half being passed directly from said thimble to said second of said apertures in a direction from said first side of said plate to said second side of said plate, said first and second wire halves being laced successively through a predetermined number of the remaining apertures, said wire halves being of sufficient length so that the ends thereof extend a predetermined distance beyond the last aperture through which said wire halves are laced, said distance defining the length of the desired shock absorbing stroke;

means on the respective ends of said wire halves to prevent the passage of said ends through said apertures; and a strap secured at said slot in said plate and adapted to be secured to said aircraft;

whereby upon a hard or crash landing said wire halves are caused to be drawn through said apertures to absorb the shock thereof.

2. A shock absorbing device comprising a plate having a plurality of longitudinally spaced transverse apertures, said plate having a strap receiving slot at one end thereof and an enlarged head portion having a cable thimble receiving recess at the other end thereof;

a cable thimble normally disposed in said recess; and a wire looped at its effective midpoint around said cable thimble, the ends of said wire being oppositely interlaced through said apertures and extending a substantial distance beyond the slotted end of said plate, said wire ends being looped to prevent passage thereof through said apertures;

whereby upon the application of a tension force applied to said cable thimble and strap receiving slot, said wire is caused to be drawn through said apertures thereby absorbing shock energy over the entire length thereof.

3. A shock absorbing device comprising a plate having a plurality of transverse apertures;

a wire folded near its effective midpoint and interlaced through said apertures, the ends of said wire extending beyond the end of the last aperture through which said wire passes; and means for applying a tension force to said wire;

whereby upon said tension force exceeding a predetermined amount, said wire is caused to be drawn through said apertures thereby absorbing shock energy.

4. A shock absorber, as set forth in claim 3, wherein said means for applying a tension force to said wire comprises a cable thimble normally disposed in a recess in said plate, said wire being looped near its effective midpoint around said cable thimble; and a webbing strap for securing said plate against movement.

No references cited.

DUANE A. REGER, *Primary Examiner.*